United States Patent
Rao et al.

(10) Patent No.: US 8,341,573 B2
(45) Date of Patent: Dec. 25, 2012

(54) MODELING APPROACH FOR TIMING CLOSURE IN HIERARCHICAL DESIGNS LEVERAGING THE SEPARATION OF HORIZONTAL AND VERTICAL ASPECTS OF THE DESIGN FLOW

(75) Inventors: Vishwas M. Rao, Breinigsville, PA (US); Joseph J. Jamann, Nazareth, PA (US); James C. Parker, Zionsville, PA (US)

(73) Assignee: LSI Corporation, Milpitas, CA (US)

( * ) Notice: Subject to any disclaimer, the term of this patent is extended or adjusted under 35 U.S.C. 154(b) by 0 days.

(21) Appl. No.: 12/905,301

(22) Filed: Oct. 15, 2010

(65) Prior Publication Data

US 2012/0095746 A1 Apr. 19, 2012

(51) Int. Cl.
*G06F 9/455* (2006.01)
*G06F 17/50* (2006.01)

(52) U.S. Cl. ........ 716/108; 716/106; 716/113; 716/118; 703/19

(58) Field of Classification Search .................. 716/106, 716/108, 111, 113, 118; 703/19
See application file for complete search history.

(56) References Cited

U.S. PATENT DOCUMENTS

| | | | |
|---|---|---|---|
| 6,496,972 B1 * | 12/2002 | Segal | 716/103 |
| 6,604,227 B1 * | 8/2003 | Foltin et al. | 716/104 |
| 6,622,291 B1 * | 9/2003 | Ginetti | 716/108 |
| 6,928,630 B2 * | 8/2005 | Moon et al. | 716/134 |
| 7,178,120 B2 | 2/2007 | Hieter et al. | |
| 2009/0177424 A1 * | 7/2009 | Pasqualini | 702/79 |

OTHER PUBLICATIONS

Design Planning Methodology for Rapid Chip Deployment; David E. Lackey; IBM Microelectronics, Essex Junction, Vermont, 05452; 7 pages.
U.S. Appl. No. 12/510,104, filed Jul. 27, 2009; entitled, "A Method for Designing Integrated Circuits Employing a Partitioned Hierarchical Design Flow and an Apparatus Employing the Method".

* cited by examiner

*Primary Examiner* — Nha Nguyen

(57) ABSTRACT

A method of designing an integrated circuit and a model of an integrated circuit block, an electronic design automation tool, an apparatus and a computer-readable medium are disclosed herein. In one embodiment, the method of designing an integrated circuit includes: (1) generating a timing budget for the integrated circuit employing designer input of the integrated circuit, (2) establishing design constraints for a block of the integrated circuit employing the timing budget, (3) creating an input and output timing budget for the block employing the design constraints, (4) combining implementation information for the integrated circuit based on designer knowledge with the input and output timing budget to generate an updated input and output timing budget and (5) generating a model of the block based on the updated input and output timing budget.

7 Claims, 4 Drawing Sheets

MODELING APPROACH FOR TIMING CLOSURE IN HIERARCHICAL DESIGNS LEVERAGING THE SEPARATION OF HORIZONTAL AND VERTICAL ASPECTS OF THE DESIGN FLOW

TECHNICAL FIELD

This application is directed, in general, to circuits and, more specifically, to a hierarchical design flow for integrated circuits.

BACKGROUND

Designers of circuits (i.e., integrated circuits) may use electronic design automation (EDA) tools, a category of computer aided design (CAD) tools, to create a functional circuit design, including a register transfer logic (RTL) representation of the functional circuit design, synthesize a "netlist" from the RTL representation, and implement a layout from the netlists. Synthesis of the netlist and implementation of the layout involve simulating the operation of the circuit and determining where cells should be placed and where interconnects that couple the cells together should be routed. EDA tools allow designers to construct a circuit, simulate its performance, estimate its power consumption and area and predict its yield using a computer and without requiring the costly and lengthy process of fabrication. EDA tools are indispensable for designing modern integrated circuits, particularly very-large-scale integrated circuits (VSLICs). For this reason, EDA tools are in wide use.

Multiple EDA tools may be used when designing an integrated circuit. To manage the combination of the EDA tools that are used to design an integrated circuit, design flows are typically used. One type of design flow supports a hierarchical design methodology that allows designers to address problems on the physical side of the design process between logic synthesis and the implementation process. In a hierarchical design flow, designers can apply physical constraints to assist in controlling the initial implementations of an integrated circuit design through early analysis and floor planning. Floor planning involves planning for the placement of various components, such as hierarchical design components, inside an integrated circuit. With a hierarchical design flow, EDA tools can allow a designer to reduce the number of iterations between running PAR (Place and Route) and then returning to the register transfer level (RTL) and synthesis thereof.

For a hierarchical design methodology, each functional block of an integrated circuit design is typically characterized into an abstract timing model. The abstracted timing model is employed to in a design flow of the integrated circuit that is used to arrive at timing closure. Different CAD tools are provided that use various abstraction methods to capture the hierarchical modeling information. Extracted Timing Models (ETMs) and Interface Logic Models (ILMs) from Synopsis, Inc., of Mountain View, Calif., are examples of conventional abstraction tools that may be used.

Current design methodologies approach timing model abstraction of hierarchical hard-macros (HHMs) from an outside-in perspective. A HHM is a logical block in a circuit design that is implemented as a physical hierarchy. Though this is the same perspective used to model standard cells such as flip-flops, there are fundamental problems associated with this approach when applied to HHMs. For example, the typical outside-in approach does not consider the fact that models of HHMs interact with CAD tools in a more complex manner as opposed to standard cell models. The models of HHMs are subject to effects of variability in the design flow due to the lack of (and changing nature of) interface information early in the design process. The netlist and parasitics in the early iterations of the block provide an inaccurate representation of the true timing bounds on the interface of the HHMs models, thereby introducing error in the design flow.

Additionally, representing the combinations of the different timing modes for an integrated circuit block, typically referred to as horizontal requirements, and the Process, Voltage and Temperature (PVT) corners for each of the timing modes can be challenging. FIG. 5 provides an example of a conventional hierarchical design flow 500 for designing an integrated circuit that includes X horizontal modes and Y PVT corners for each of the modes. The number of PVT combinations represented increases even more when considering the additional Z parameters needed to represent the timing information from the vertical requirements of the design flow that are generated one model at a time. The vertical portion of the design flow 500 includes timing information from the placement (i.e., ideal clocks information), clock-tree synthesis (CTS) (i.e., propagated clocks information) and routing (i.e., customized timing, derate and on-chip variation (OCV) information). Accordingly, problems with the design of integrated circuit blocks and the integrated circuit can occur.

SUMMARY

In one aspect, a method of designing an integrated circuit is provided. In one embodiment, the method includes: (1) generating a timing budget for the integrated circuit employing designer input of the integrated circuit, (2) establishing design constraints for a block of the integrated circuit employing the timing budget, (3) creating an input and output timing budget for the block employing the design constraints, (4) combining implementation information for the integrated circuit based on designer knowledge with the input and output timing budget to generate an updated input and output timing budget and (5) generating a model of the block based on the updated input and output timing budget.

Another aspect of the invention provides a method of generating a model of a block of an integrated circuit. In one embodiment, the method includes: (1) generating an input and output timing budget for the block based on design constraints of the block and a netlist of the block, (2) updating the input and output timing budget with clock customization data based on designer knowledge of the integrated circuit and (3) providing the model for the block based on the update of the input and output timing budget, wherein the model represents clock information of the block separately from data path information of the block.

In yet another aspect, an EDA tool is provided. In one embodiment, the EDA tool includes: (1) a block analyzer configured to analyze design constraints and structures of a block of an integrated circuit to generate input and output timing constraints for the block and (2) an interface timing generator configured to combine the input and output timing constraints with clock customization data based on designer knowledge of the integrated circuit to generate interface timing parameters for the block.

In still yet another aspect, a computer-readable medium is disclosed. In one embodiment, the computer-readable medium has stored thereon instructions that, when executed, implement a method for designing an integrated circuit, the method including: (1) generating an input and output timing budget for the block based on design constraints of the block and a netlist of the block, (2) updating the input and output timing budget with clock customization data based on designer knowledge of the integrated circuit and (3) providing the model for the block based on the update of the input and output timing budget, wherein the model represents clock information separately from data path information.

A still different aspect provides an apparatus. In one embodiment, the apparatus includes: (1) circuitry for generating a timing budget for the integrated circuit employing designer input of the integrated circuit, (2) circuitry for establishing design constraints for a block of the integrated circuit employing the timing budget, (3) circuitry for creating an input and output timing budget for the block employing the design constraints, (4) circuitry for combining implementation information for the integrated circuit based on designer knowledge with the input and output timing budget to generate an updated input and output timing budget and (5) circuitry for generating a model of the block based on the updated input and output timing budget.

The foregoing has outlined certain aspects and embodiments of the invention so that those skilled in the pertinent art may better understand the detailed description of the invention that follows. Additional aspects and embodiments will be described hereinafter that form the subject of the claims of the invention. Those skilled in the pertinent art should appreciate that they can readily use the disclosed aspects and embodiments as a basis for designing or modifying other structures for carrying out the same purposes of the invention. Those skilled in the pertinent art should also realize that such equivalent constructions do not depart from the scope of the invention.

BRIEF DESCRIPTION OF THE DRAWINGS

For a more complete understanding of the invention, reference is now made to the following descriptions taken in conjunction with the accompanying drawings, in which.

DETAILED DESCRIPTION OF CERTAIN ASPECTS AND EMBODIMENTS

Figure 1:
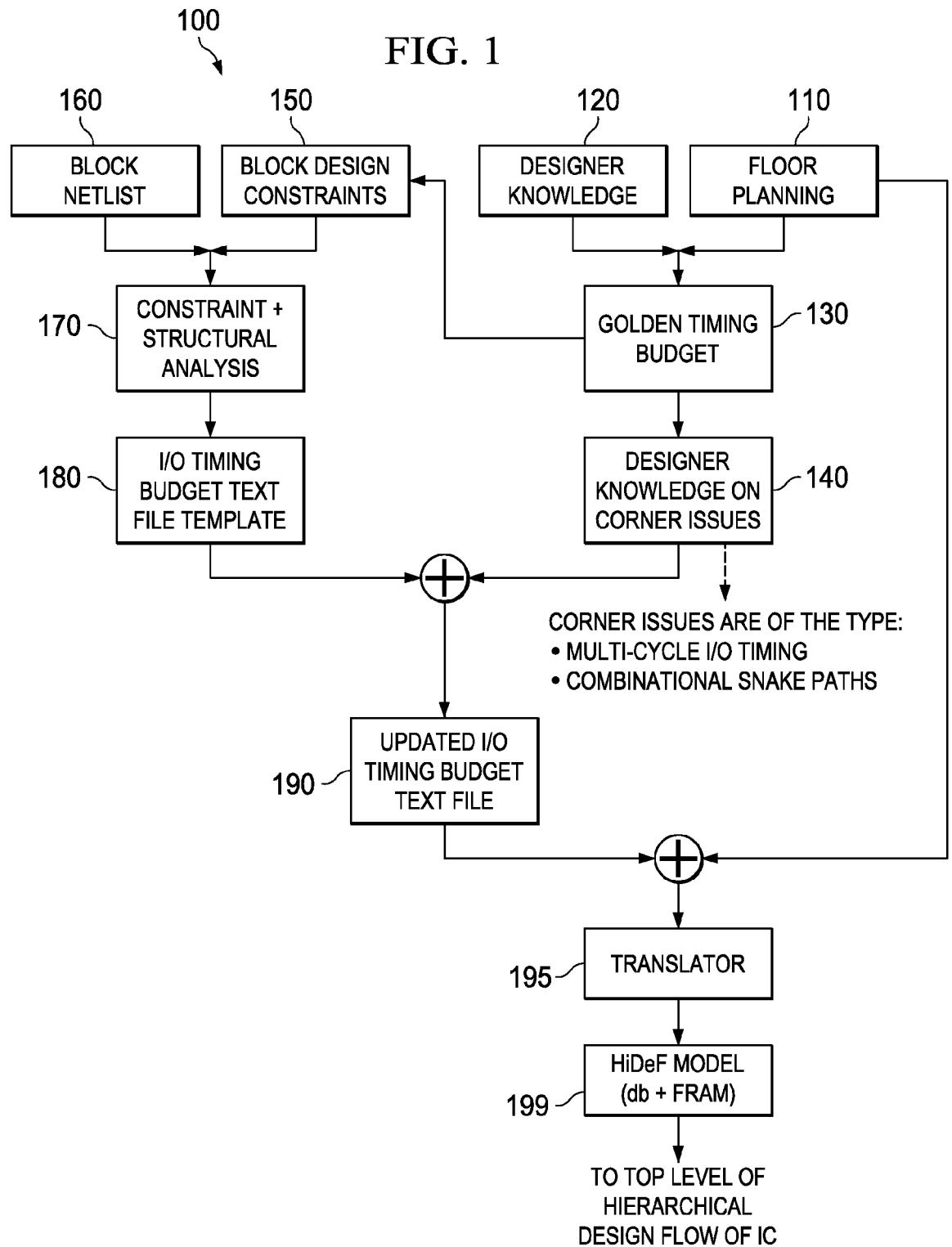
FIG. 1 illustrates a block diagram of an embodiment of a hierarchical design flow for designing an integrated circuit according to the principles of the disclosure.

Some conventional abstraction tools employed to capture hierarchical modeling information may depend strongly on the netlist and, if available, the parasitics of an integrated circuit design. This reliance for developing a model, however, does not allow the HHM model to shield the integrated circuit design from variability in timing along the design flow, and can cause timing yo-yoing. In addition, the abstracted models may not easily accommodate design flow-aspects such as CTS. Instead, some abstraction modelers may accommodate CTS using mode-representation. Modes may be used for representing different constraints, such as different functional modes or Design For Test (DFT) modes, and may be considered horizontal components in an integrated circuit design flow. The horizontal components of a design flow, however, may be non-intuitive for changes introduced by vertical steps in the design flow. Moreover, the extracted models cannot separate the clock and data components of delay once the abstraction process has been done. These limit the models in terms of use with varying derate numbers—requiring a different model for different derating. In the future, other sophisticated vertical analysis requirements can complicate this further and require even more models due to the vertical components of the design flow.

The disclosure provides a method for designing an integrated circuit that separates the vertical and the horizontal components of the design flow. This separation of the vertical and horizontal components allows the design flow to accommodate variability associated with the different timing modes, and also accommodate changes in timing due to vertical steps of the design flow (e.g., CTS and derate-changes).

The disclosed method recognizes that clock path information is an important factor in the flow of the vertical components in a hierarchical design flow (HiDeF). As such, the disclosed method separates the clock path timing inside a hierarchical model to achieve the separation of the horizontal and vertical components of the design flow and does not attempt to consolidate this information in a single timing check or arc. Additionally, the disclosed method allows for insertion of designer knowledge into the timing arcs and does not depend solely on circuit timing information (such as from netlist, design constraints and parasitics of an integrated circuit block) to construct a model of an integrated circuit block.

Thus, the disclosure provides a modeling flow (e.g., a HiDeF) that allows a designer to input design information in conjunction with the netlist, design constraint and parasitic data of an integrated circuit block, and combine this information with effective clock-data separation, to arrive at a modeling methodology that can help absorb variability of requirements and constraints through the modeling flow. In addition, the disclosed modeling method prevents mode explosion that can result when mode representations are used as horizontals in design flows. The disclosed modeling flow allows the separation of the horizontals and the verticals in order to accomplish (a) prevention of mode explosion, and (b) allow CAD tools to operate seamlessly without the errors involved in mode-switching during placement and routing (P&R) and analysis. The disclosed modeling flow can also provide an integrated circuit block model that represents generated clocks, internal clocks and source synchronous logic. The disclosed modeling flow and model can handle ideal and propagated clocks seamlessly without a need to shift to different horizontal modes. Instead, a single hierarchical model of an integrated circuit block can be used for multiple modes. Additionally, with the disclosed modeling flow, customization clock data that represents clock changes from the vertical components of a design flow (e.g., clock-derating and on-chip variation (OCV) calculations) does not require re-generation of a new model. With the disclosed modeling flow and model, a designer can separate the setup/hold/ckq information from the clock-delay at all times while viewing the timing reports, thereby permitting control of manual optimizations (and ECOs) if required late in the design cycle.

FIG. 1 illustrates a block diagram of an embodiment of a hierarchical design flow 100 for designing an integrated circuit according to the principles of the disclosure. The hierarchical design flow 100 directs the generation of a model for a block of the integrated circuit. The generated model, for example a HiDeF model, is partitioned to separate clock information from data path information and may be used as an analytical tool to determine if the design of the integrated circuit is "close-able." The hierarchical design flow 100 employs an original floor plan of the integrated circuit design with an updated input/output timing budget to generate the HiDeF model.

The hierarchical design flow 100 includes Floor Planning 110 and Designer Knowledge 120. The Floor Planning 110 involves planning for the placement of components or blocks of the integrated circuit design that are typically independently designed and placed together to form an integrated circuit such as a system-on-chip (SOC). The placement information of the integrated circuit design generated from the Floor Planning 210 provides timing information between components of the integrated circuit design. Typically this timing information is considered ideal clocks. The Floor Planning 210 typically receives data from logic synthesis of the integrated circuit design generated from a RTL.

The Designer Knowledge 120 represents input from a designer or designers of the integrated circuit. The input may include timing information for the integrated circuit and the integrated circuit block. The timing information from the Designer Knowledge 120 may include timing information that has not yet been generated in an electronic format. In other words, the timing information input by the designer may be for components that have not yet been logically synthesized or available from a library cells. The designer or designers may manually input the timing information.

Both the placement information from the Floor Planning 110 and the manual timing information from the Designer Knowledge 120 are provided to the Golden Timing Budget 130 and used thereby to generate I/O constraints for the integrated circuit design. The Golden Timing Budget 130 refers to a timing budget for each block of the integrated circuit that is derived from top level timing constraints such that a final integrated circuit (i.e., a chip or SOC) assembly yields the desired timing performance.

The I/O constraints from the Golden Timing Budget 130 are provided to Designer Knowledge on Corner Issues 140. As with the Designer Knowledge 120, the Designer Knowledge on Corner Issues 140 may be manually input by the designer(s). This step of the modeling flow 100 allows designer knowledge of PVT corners to be added to the design process. Additionally, this designer knowledge may include multi-cycle I/O timing information and combinational snake paths. A snake path is a combinational path that goes directly from the input-pin of a HHM to the output pin of a HHM without any registering (i.e., without being flopped). As such, PVT information may be manually added to the hierarchical design flow 100 by a designer.

Returning back to the Golden Timing Budget 130, the I/O constraints from the Golden Timing Budget 130 are also provided to the Block Design Constraints 150. The Block Design Constraints 150 includes constraints that reflect the intent of the design. The Block Design Constraints 150 may define constraints for clocking, timing, testing and operating conditions for the integrated circuit block. Additionally, the constraints may be used to define synthesis, power, test and environmental and operating conditions. In one embodiment, the Block Design Constraints 150 may in the Synopsys' Design Constraint (SDC) format that is often used in the industry for describing design constraints. The SDC format is available from Synopsis, Inc.

In addition to the design constraint information from the Block Design Constraints 150, Block Netlist 160 includes additional design information for the integrated circuit block. The Block Netlist 160 includes the connectivity information for the integrated circuit block and information about the I/O pins thereof. In one embodiment, the netlist information may be generated from a Verilog tool or another hardware description language application.

The information from the Block Design Constraints 150 and the Block Netlist 160 are provided to Constraint and Structural Analysis 170. The Constraint and Structural Analysis 170 analyzes the information from both the Block Design Constraints 150 and the Block Netlist 160 to generate I/O timing information based thereon. In one embodiment, a proprietary analyzer may be used to perform the analyzing and generate the timing information. In alternative embodiments, a conventional EDA tool may be configured to perform the constraint and structural analysis from the Block Design Constraints 150 and the Block Netlist 160 data.

The I/O timing information based on both the Block Design Constraints 150 and the Block Netlist 160 is provided to I/O Timing Budget Text File Template 180. The text file generated from the Block Design Constraints 150 and the Block Netlist 160 may be a proprietary format. The text file may be in a format for a hierarchical design flow.

The text file from the I/O Timing Budget Text File Template 180 and the updated golden timing budget from the Designer Knowledge on Corner Issues 140 are combined to generate an Updated I/O Timing Budget Text File 190. The Updated I/O Timing Budget Text File 190 is then combined with information from the Floor Planning 110 to generate a HiDeF Model Timing File that is provided to a Translator 195. As such, the Updated I/O Timing Budget Text File 190 and floor planning information may be input to the Translator 195. The format of the HiDeF Model Timing File may vary depending on the type of Translator 195. The Translator 195, for example, may be a conventional translator used in integrated circuit design that reads and interprets the HiDef Model Timing File, understands the syntax and semantics thereof and generates an industry standard timing model file for CAD tools. In some embodiments, the Translator 195 may be a proprietary device developed to read and interpret a HiDef Model Timing File that is also proprietary. As such, the format of the HiDeF Model Timing File is adaptable. The Translator 195 employs the HiDeF Model Timing File to generate the HiDeF Model 199. The HiDeF Model 199 may also be generated in various formats depending on the implementation. For example, as illustrated in FIG. 1, the HiDeF Model 199 may be generated in the timing format db and the physical format FRAM from Synopsis. The generated HiDeF Model 199 may be provided to a hierarchical design flow of the integrated circuit and employed therein to arrive at timing closure for the integrated circuit.

Figure 2:
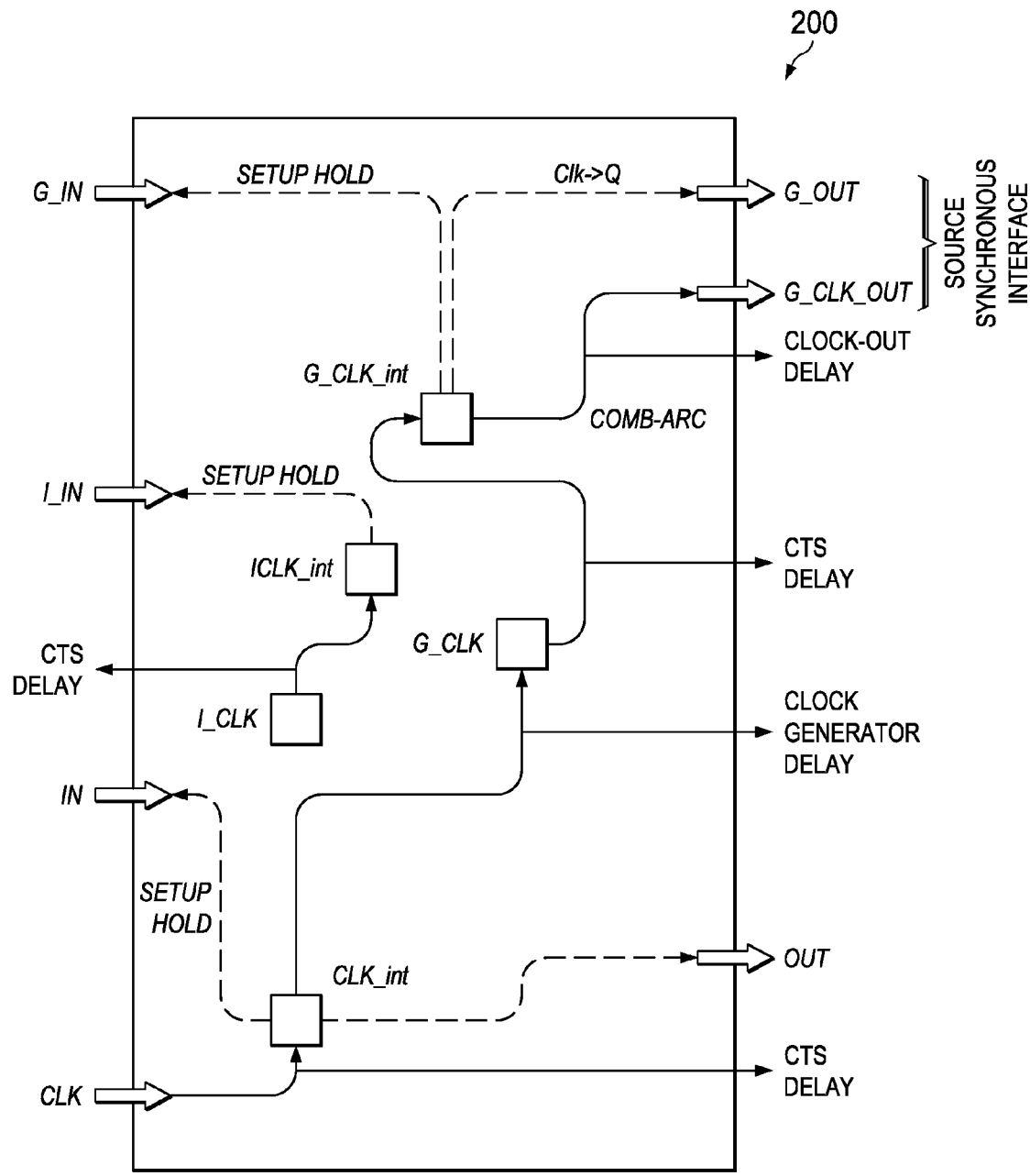
FIG. 2 illustrates a diagram of an embodiment of a model of an integrated circuit block generated according to the principles of the disclosure.

FIG. 2 illustrates an embodiment of a HiDeF model 200 of an integrated circuit block constructed according to the principles of the disclosure. In one embodiment, the HiDeF model 200 is generated according to the hierarchical design flow 100 of FIG. 1. The HiDeF Model 200 is a model of a block of an integrated circuit that can be used in the top level of the design flow for the integrated circuit. The HiDeF Model 200 separates clock inputs and data inputs of an integrated circuit block. As such, EDA tools are clearly able to see the difference between clock information and data. The HiDeF Model 200 allows the changes that may occur during a design process to be represented such that multiple models do not have to be generated. Real (i.e., known) and projected clock information can be added to the HiDeF Model 200 to reflect changes during the design process.

The HiDeF Model 200 has artificial points that are created to separate the data from the clock and accommodate changes to the clock during the design process. Thus, the HiDeF Model 200 anticipates downstream effects of the integrated circuit design and can handle both ideal clock and propagating clock without multiple models needed to reflect clock changes.

The HiDeF Model 200 includes internal points (i.e., the artificial points) and external points (i.e., boundary points) that represent pins of the integrated circuit block. The external points represent inputs and outputs of the HiDeF Model 200. The external points include inputs G_IN, I_IN, IN and CLK and outputs G_OUT, G_CLK_OUT and OUT. IN, G_IN and I_IN are data input pins that correspond to different clocks associated with the integrated circuit block. IN represents data associated with the clock that is provided to the integrated circuit block, CLK. G_IN represents data that is associated with a clock G_CLK that is generated by the integrated circuit block from the clock input CLK. I_IN represents data that is associated with an internal clock of the integrated circuit block I_IN.

Regarding the outputs, OUT is a data output pin for the data input at IN. G_OUT is a data output pin for the data input G_IN. G_CLK_OUT is an output pin for the generated clock G_CLK. In combination, the G_OUT and the G_CLK_OUT provide a synchronous output for the HiDeF Model 200.

Each of the external points is coupled to at least one internal point. The internal points are artificial points that that are added to model the integrated circuit block and to allow the separation of the clock and data inputs. The internal points include a CLK_int, a G_CLK, a G_CLK_int, a I_CLK and a ICLK_int. The CLK_int represents the clock input CLK and a CTS delay associated with the clock input CLK. As illustrated, conventional setup and hold constraints are based from the CLK_int to provide an improved check since CTS delay is also included. A more accurate representation of the external point OUT is also provided since it is coupled to the CLK_int that includes the CTS delay. The CLK_int internal point is also coupled to the G_CLK internal point. G_CLK represents generation of the generated clock and includes the clock generator delay after receipt of the clock input CLK and the CTS delay. The G_CLK_int point represents the generated clock after the CTS delay. The G_CLK_int is coupled to both the input pin G_IN and the output pin G_OUT. Conventional setup and hold constraints are represented between the G_CLK_int internal point and the G_IN external point. Conventional arc constraints and models couple the G_CLK_int internal point to the G_OUT external point (e.g., Clk→Q). A clock-out delay is used to couple the G_CLK_int internal point to the G_CLK_OUT external point.

Generation of the internal clock is represented by the internal pin I_CLK. ICLK_int coupled to the I_CLK internal pin represents the internal clock I_CLK and the CTS delay. Setup and hold constraints are then reflected between the I_IN external pin and the ICLK_int internal pin.

With the separation of the data and the clock, the HiDeF Model 200 provides a model of an integrated circuit block with interface timing for the integrated circuit that is a merger of both circuit timing (e.g., netlist, design constraints and parasitics) and designer knowledge. The interface timing provided by the HiDeF Model 200 can be used as part of the placement and routing of the integrated circuit to achieve timing closure.

Figure 3:
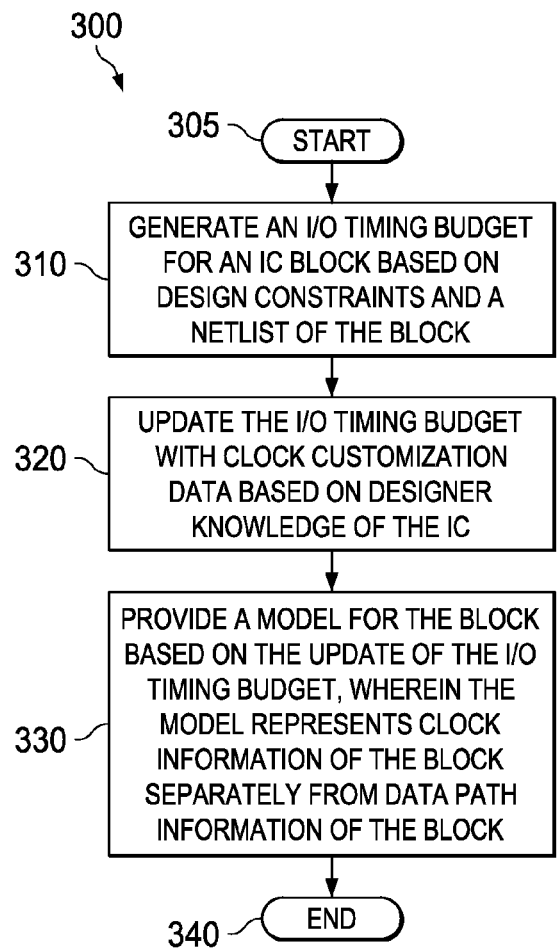
FIG. 3 illustrates a flow diagram of an embodiment of a method 300 of generating a model of an integrated circuit block carried out according to the principles of the disclosure.

FIG. 3 illustrates a flow diagram of an embodiment of a method 300 of generating a model of an integrated circuit block carried out according to the principles of the disclosure. A portion of the method 300 may be performed by an apparatus and EDA tools. In one embodiment, the apparatus may be a computer having the necessary circuitry (including a processor and memory) and/or software to perform at least a portion of the method 300. The method 300 begins in a step 305.

In a step 310, an input and output timing budget for the integrated circuit block is generated based on design constraints of the integrated circuit block and a netlist of the integrated circuit block. The input and output timing budget is then updated with customization clock data based on designer knowledge of the integrated circuit in a step 320. Thereafter, in a step 330 a model of the integrated circuit block is provided based on the update of input and output timing budget, wherein the model represents clock information separately from data path information. The method 300 then ends in a step 340.

Figure 4:
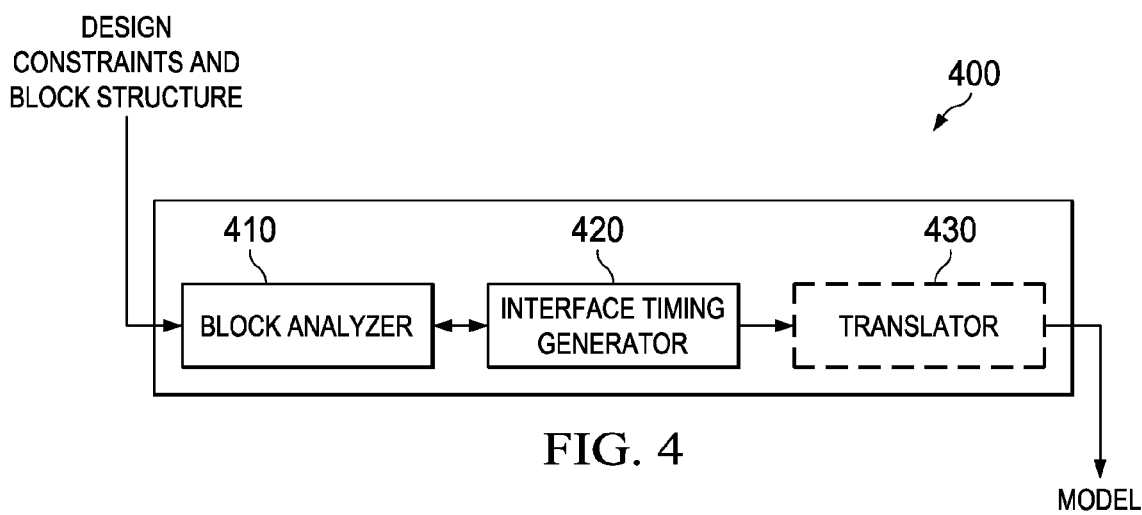
FIG. 4 illustrates a block diagram of an embodiment of a model generator constructed according to the principles of the disclosure.
Figure 5:
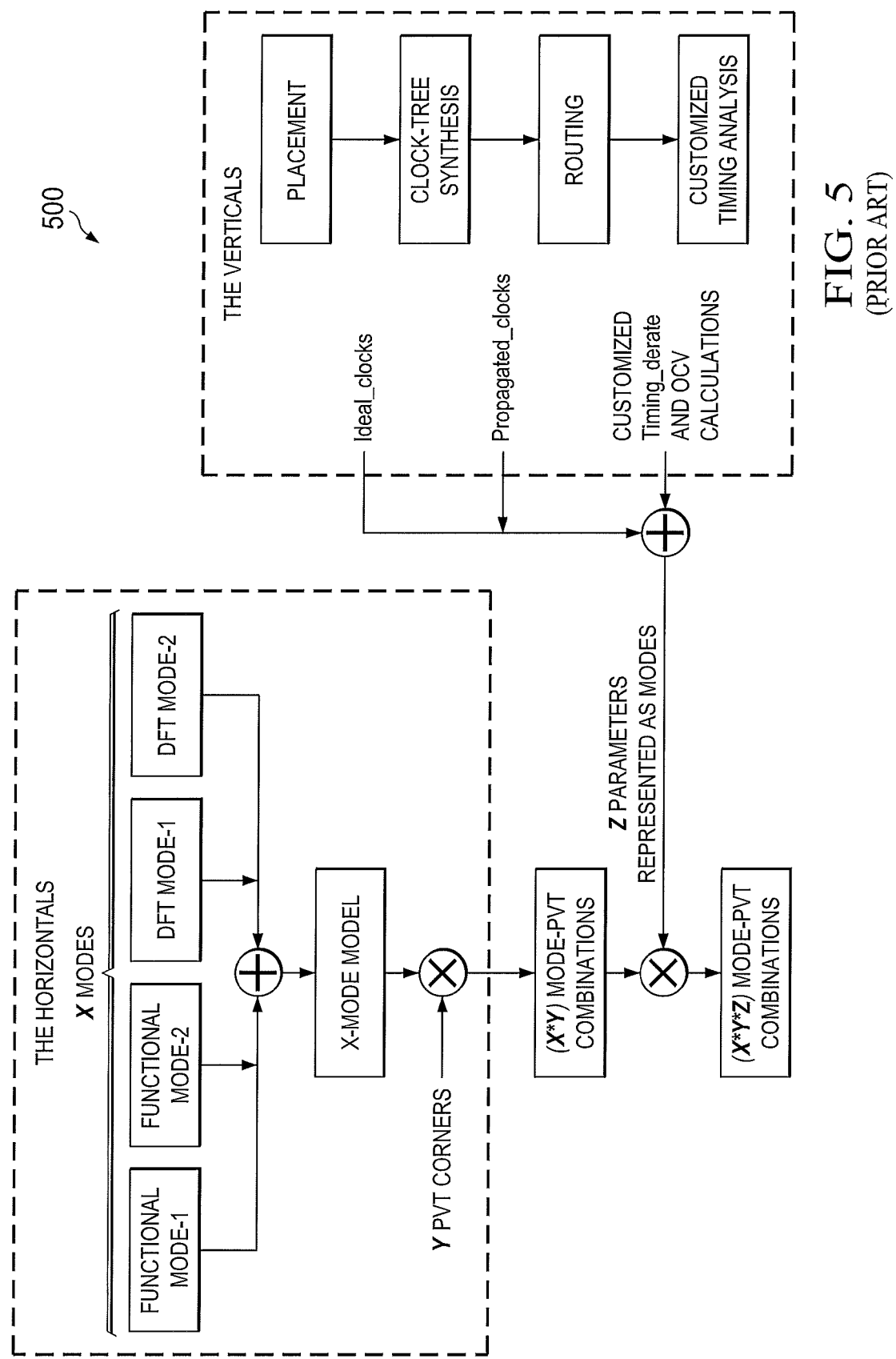
FIG. 5 illustrates a block diagram of an embodiment of a conventional hierarchical design flow for designing an integrated circuit.

FIG. 4 illustrates a block diagram of an embodiment of a model generator 400 constructed according to the principles of the disclosure. The model generator 400 may be a dedicated computing device. The model generator 400 may include the necessary circuitry to generate a model, such as a HHM model. In one embodiment, at least a portion of the model generator 400 may be embodied as a series of operating instructions stored on a computer readable medium that direct the operation of a processor when initiated thereby. The model generator 400 may employ various EAD tools.

The model generator 400 includes a block analyzer 410, an interface timing generator 420 and a translator 430. The block analyzer 410 is configured to analyze design constraints and structures of a block of an integrated circuit to generate input and output timing constraints for the block. The interface timing generator 420 is configured to combine the input and output timing constraints with designer knowledge input to generate interface timing parameters for the block. The ideal clock and propagated clock from a design flow of the integrated circuit are represented in the designer knowledge input. Additionally, customization details of the clock through the vertical components of a design flow for the integrated circuit are included in the designer knowledge input.

The translator 430 is configured to generate a model of the block based on the interface timing parameters. The translator 430 may be a conventional translator that is used in the integrated circuit design field to abstract models. Different translators may be used depending on the type of model desired. In some embodiments (as represented by the dashed lines in FIG. 4), the translator 430 may be independent of the model generator 400 which includes the block analyzer 410 and the interface timing generator 420. As such, the interface timing generator 420 may provide a text file in a designated format that can then be provided to another party for translation into a model.

The above-described apparatuses and methods may be embodied in or performed by various conventional digital data processors or computers, wherein the computers are programmed or store executable programs of sequences of software instructions to perform one or more of the steps of the methods, e.g., steps of the methods of FIG. 1 or FIG. 3. The software instructions of such programs may represent algorithms and be encoded in machine-executable form on conventional digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, e.g., one or more of the steps of the method of FIG. 1 or FIG. 3. Additionally, an apparatus, such as an EDA tool or tools, may be designed to include the necessary circuitry to perform each step of the methods of FIG. 1 or FIG. 3.

Those skilled in the art to which the invention relates will appreciate that other and further additions, deletions, substitutions and modifications may be made to the described embodiments without departing from the scope of the invention.

What is claimed is:

1. A method of designing an integrated circuit, comprising:
generating a timing budget for said integrated circuit employing designer input of said integrated circuit;
establishing design constraints for a block of said integrated circuit employing said timing budget;
creating an input and output timing budget for said block employing said design constraints;
combining implementation information for said integrated circuit based on designer knowledge with said input and output timing budget to generate an updated input and output timing budget; and
generating, using a processor, a model of said block based on said updated input and output timing budget, wherein said model represents clock information separately from data information; and
combining said updated input and output timing budget with floor planning information of said integrated circuit to provide timing and physical parameters for said block and translating said timing and physical parameters to generate said model.

2. The method as recited in claim 1 further comprising employing said model at a top level of a design flow of said integrated circuit to arrive at timing closure for said integrated circuit.

3. The method as recited in claim 1 wherein said generating a timing budget further employs floor planning information for said integrated circuit.

4. The method as recited in claim 1 wherein said creating an input and output timing budget for said block further employs a netlist of said block.

5. The method as recited in claim 1 wherein said designer knowledge includes designer knowledge on corner issues of said integrated circuit.

6. The method as recited in claim 5 further comprising receiving said designer knowledge through a manual input.

7. An apparatus, comprising:
circuitry for generating a timing budget for said integrated circuit employing designer input of said integrated circuit;
circuitry for establishing design constraints for a block of said integrated circuit employing said timing budget;
circuitry for creating an input and output timing budget for said block employing said design constraints;
circuitry for combining implementation information for said integrated circuit based on designer knowledge with said input and output timing budget to generate an updated input and output timing budget;
circuitry for generating a model of said block based on said updated input and output timing budget, wherein said model represents clock information separately from data information; and
circuitry for combining said updated input and output timing budget with floor planning information of said integrated circuit to provide timing and physical parameters for said block and translating said timing and physical parameters to generate said model.

* * * * *